Feb. 26, 1957  H. J. ROSENBERG  2,783,035
AERATION-VALVE ATTACHMENT FOR WATER FAUCET
Filed Oct. 12, 1954
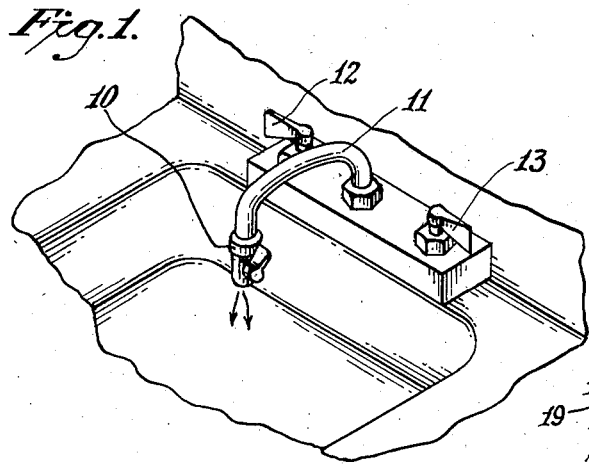
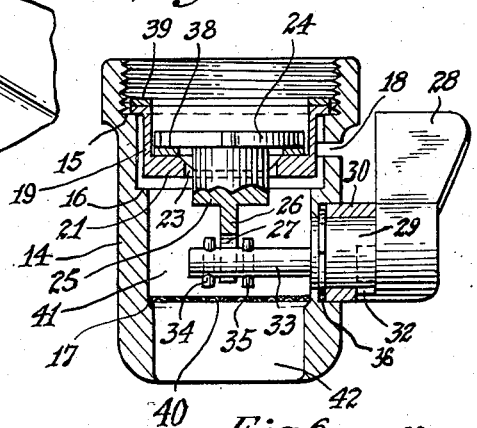
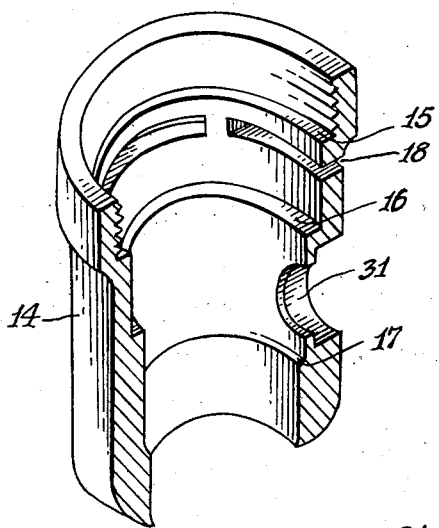
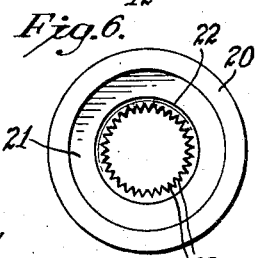
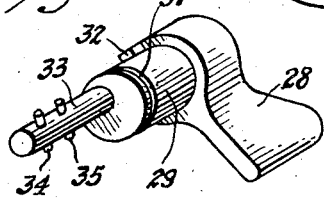
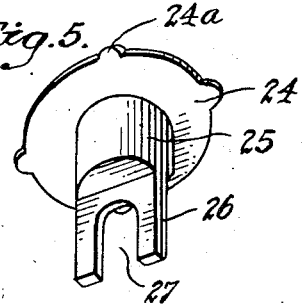
HAROLD J. ROSENBERG
INVENTOR.
BY
Kenyon & Kenyon
ATTORNEYS.

United States Patent Office 2,783,035
Patented Feb. 26, 1957

2,783,035

AERATION-VALVE ATTACHMENT FOR WATER FAUCET

Harold J. Rosenberg, Bronxville, N. Y.

Application October 12, 1954, Serial No. 461,814

2 Claims. (Cl. 261—71)

The present invention relates generally to attachments for mixing-type water faucets and more particularly to an aeration valve attachment for a standard hot-and-cold-water-mixing faucet, which attachment is adapted concurrently to control the flow rate of water discharged from the faucet independently of the temperature thereof and to aerate the water so that it ultimately is discharged as a foam.

The conventional water-mixing faucet is constituted by hot and cold valves coupled to a common outlet or spout. The temperature of the water discharged from the spout is ordinarily governed by the relative amounts of hot and cold water fed thereto by the respective valves. The rate of water flow from the spout is determined by the combined flow from the hot-and-cold-water valves. Consequently, where it desired to increase or decrease the rate of water flow from the spout without at the same time changing the temperature of the water, it is necessary to manipulate both the "hot" and "cold" handles so as to increase or decrease the flow therefrom while maintaining a given ratio therebetween to avoid a change in water temperature. As a practical matter, this adjustment is difficult to carry out efficiently and constitutes a distinct inconvenience. For example, in using a kitchen or bathroom sink, let us assume that by operating the hot and cold handles, the temperature has first been adjusted to suit one's preference. Should it now be desired to adjust or stop the flow rate of the shower to obtain a stronger or weaker stream, or no stream at all, this can be accomplished without again making a relative adjustment of the hot and cold handles. Similarly, in dishwashing, every time an adjustment is to be made in water flow, a re-adjustment of the hot and cold handles is involved to attain the desired temperature.

Aerating attachments are known for faucets of the type wherein the fluid discharged from the faucet is aerated and then discharged as a foam formed by a large number of minute bubbles. Such aerating devices function to provide a nonsplash flow and they entail an admixture of air and water in a chamber. Aerators operate most effectively when the water flows into the aerating chamber at a substantial velocity—hence, a high kinetic energy. When such aerating devices are connected to the spout of hot and cold mixing faucets, difficulty is experienced in obtaining the desired water velocity without altering the temperature of the water. In practice, therefore, frequent adjustments are necessary in the hot and cold controls to obtain effective aeration at a predetermined temperature.

In view of the foregoing, it is the primary object of the present invention to provide and attachment adapted to be coupled to a standard hot-and-cold-water-mixing faucet for adjusting the rate of water flow therefrom independently of the water temperature.

More particularly, it is the object of the invention to provide an attachment of the above-identified type including a cam-operated valve which is continuously adjustable to control the rate of water flow.

Still another object of the invention is to provide an aeration-valve attachment attachable to any standard mixing-type faucet, which attachment includes a valve assembly and an air-mixing chamber wherein the water controlled by the valve is admixed with air drawn in through openings in the valve casing.

It is still another object of the invention to provide an attachment of the above-described type wherein the valve includes a valve seat having circumferentially-arranged serrations adapted finely to break up the water flowing into the air-mixing chamber to promote the admixture thereof. A significant feature of the invention resides in the fact that the attachment may be readily dismantled for cleaning and replacement or repair of the component parts.

Still another object of the invention is to provide an aeration-valve attachment of the above-described type which may be readily connected to a water spout, which is of efficient, simple and sturdy design and which may be inexpensively manufactured and sold at reasonable cost.

For a better understanding of the invention as well as other objects and further features thereof, reference is made to the following detailed description to be read in conjunction with the accompanying drawing, wherein like elements in the several views are identified by like reference numerals.

In the drawing:

Fig. 1 is a perspective view showing an attachment in accordance with the invention as secured to a tap with a liquid stream flowing therefrom.

Fig. 2 is a longitudinal, cross-sectional view of the attachment shown in Fig. 1.

Fig. 3 is a perspective view showing a portion of the casing for the attachment.

Fig. 4 is a perspective view showing the handle and the cam of the attachment valve.

Fig. 5 is a perspective view showing the valve head.

Fig. 6 is a plan view showing the valve seat.

Referring now to the drawing and more particularly to Fig. 1, a preferred embodiment of an aeration-valve attachment, generally designated by numeral 10, is shown coupled to the common spout 11 of a standard hot-and-cold mixing faucet. The faucet is mounted in the usual way on a sink and is provided with a handle-operated valve 12 for controlling the flow of hot water and a similar valve 13 for controlling cold-water flow. By the relative adjustment of the handles on valves 12 and 13, the water temperature as well as the flow rate is regulated.

In using attachment 10, the valve thereon is initially opened to its maximum degree, and the valves 12 and 13 on the faucet are adjusted to discharge water through the spout 11 at the desired temperature and at the maximum velocity. The valve on attachment 10 is then fully closed. Thereafter, when one wishes to obtain water at the desired temperature, it is necessary only to manipulate the single valve on the attachment 10. The temperature of the water is unchanged, regardless of the extent to which the attachment valve is opened. Operation of the attachment valve varies the flow rate only, and after the initial adjustment of faucet valves 12 and 13 no further adjustment need be made.

As best seen in Figs. 2 to 6, the attachment 10 comprising a unitary open-ended casing 14, which is generally cylindrical in form, the upper or inlet portion 14a of the casing being enlarged to form a coupling head. The internal diameter of the casing is diminished step-wise from inlet to outlet to form a first annular shoulder 15 adjacent the upper end of the casing, an intermediate annular shoulder 16 and a third annular shoulder 17 adjacent the lower or discharge end of the casing. The coupling head portion 14a of the casing is internally-threaded for engaging the threaded mouth of the spout 11. It is to be understood, however, that the invention may be coupled to the tap or spout by other means, and if necessary a suitable adaptor may be employed for this purpose. Also to be noted is that the attachment is not limited for use in conjunction with a sink faucet.

Circumferentially-arranged at a position intermediate shoulders 15 and 16 is a series of aeration slots 18. Nested within the casing 10 is a cylindrical valve seat 19 having an outwardly-extending rim 20 which rests on shoulder 15, and a bottom wall 21 provided with a central opening 22. The surface of the bottom wall surrounding opening 22 has serrations 23 formed radially therein, the serrations being inclined in the direction of the opening.

Operatively-disposed within valve seat 19 is a disc-shaped valve head 24 having guide ears 24a, said head being supported on a cylindrical stem 25 slideable within opening 22 in the seat. Extending downwardly from stem 25 is a slab-shaped cam follower 26 provided with a U shaped notch 27. Means for raising or lowering the valve head 24 are constituted by a handle 28 secured to the end of a shaft 29 which is rotatable within a bushing 30 mounted in a side opening 31 formed in casing 10 and projecting therefrom. Shaft 29 is provided with a raised stop lug 32 which rides in an arcuate cut-out in bushing 30 and limits the movement of the shaft to a half-turn.

Eccentrically-mounted on the inner end of shaft 29 and projecting longitudinally therefrom is a cylindrical cam 33 which passes through notch 27 to effect engagement with the cam follower. In order to restrict lateral movement of the valve stem, the cam 33 is provided with pins 34 and 35 on either side of the stem member 26. Axial movement of the shaft 29 relative to bushing 30 is prevented by means of a retaining ring 36, interposed between the end of bushing 30 and the wall of the casing 10 and received within an annular recess 37 formed on shaft 29.

In operation, as the angular position of handle 28 is shifted, the resultant eccentric movement of cam 33 elevates or lowers the stem 25, depending on the direction in which the handle is turned. Thus, valve head 24 is either lifted above the bottom wall 21 of valve seat 19 to open the valve, or it rests thereon to shut the valve. To effect a water-tight seal upon closure of the valve, a suitable rubber washer 38 is interposed between valve head 24 and the bottom wall of the valve seat. A washer 39 is also placed on the rim 20 of the valve seat to effect a water-tight seal between the attachment and the spout coupled thereto.

Resting on shoulder 17 is a disc-shaped screen member 40, the space between the screen and the bottom wall 21 of the valve seat defining an air-mixing chamber 41 in which air entering slots 18 is intermingled with water passing through the valve. The area 42 below the screen 40 acts as a nozzle to discharge the foam formed in the air-mixing chamber 41.

In operation, when the valve head is lifted, water entering the attachment passes radially through the inclined serrations 23 into the air-mixing chamber 41 with substantial velocity; and, as a result, the liquid stream has a considerable kinetic energy. The flow of water draws air into the chamber 41 from the atmosphere through slots 18, according to the well-known Venturi principle. The screen 40 acts to break up finely the water and offers sufficient resistance before discharge thereof for thoroughly mixing it with the air sucked into the chamber. The fact that the water enters the air-mixing chamber through the multitude of radial paths formed by the serrations 23 serves to divide and finely break up the water and imprison in the water such small air bubbles that they remain in suspension in the jet. The introduction of the air, in the above manner, results in a splash-free flow and produces an exceptional amount of foam, highly useful for washing and other purposes.

While there has been shown what is at present considered to be a preferred embodiment of my invention, it is to be understood that many changes and modifications may be made therein without departing from the essential spirit of the invention. It is intended, therefore, in the appended claims to cover all such changes and modifications as fall within the true scope of the invention.

I claim:

1. An aeration-valve attachment adapted to be connected to the common spout of a hot-and-cold water faucet, comprising a generally cylindrical open-ended casing, a cylindrical valve seat nested in said casing adjacent the inlet end thereof, said valve seat having a bottom wall with a central opening therein, the surface of said wall surrounding said opening being serrated to form a multiplicity of water paths, a screen disposed within said casing adjacent the outlet end thereof to define an air-mixing chamber in the space between said seat and said screen, said casing having an air opening therein communicating with said chamber and the atmosphere, a valve head disposed within said seat and adjustable means to raise and lower said head relative to said seat to control the flow of water into said chamber from a condition of no flow to one of maximum flow.

2. An aeration-valve attachment adapted for coupling to the common spout of a hot-and-cold water-mixing faucet comprising a generally-cylindrical open-ended casing having a first internal annular shoulder adjacent the inlet end and a second internal annular shoulder adjacent the outlet end, a cylindrical valve seat nested within said casing and having a top rim resting on said first shoulder and a bottom wall having a central opening, the surface of said wall having serrations formed radially therein, a screen resting on said second shoulder to define an air-mixing chamber between said bottom wall and said screen, said casing having circumferentially-arranged atmospheric slots opening into said chamber, a disc-shaped valve head disposed within said seat, a stem for supporting said seat and extending through said opening in said bottom wall and provided with a cam follower extension, cam means within said chamber engageable with said cam follower, and a handle rotatably mounted on the exterior of said casing and operatively coupled to said cam to raise and lower said valve head to control water flow into said chamber from a condition of no flow to maximum flow.

References Cited in the file of this patent

UNITED STATES PATENTS

| | | |
|---|---|---|
| 1,934,553 | Mueller et al. | Nov. 7, 1933 |
| 2,247,311 | Rockwood | June 24, 1941 |
| 2,285,831 | Pennypacker | June 9, 1942 |
| 2,448,792 | Fraser | Sept. 7, 1948 |
| 2,657,954 | Bletcher et al. | Nov. 3, 1953 |

FOREIGN PATENTS

| | | |
|---|---|---|
| 698,691 | Great Britain | Oct. 21, 1953 |
| 1,000,443 | France | Oct. 10, 1951 |